US012650138B2

(12) United States Patent
Chithravelpillai et al.

(10) Patent No.: US 12,650,138 B2
(45) Date of Patent: Jun. 9, 2026

(54) ENERGY STORAGE AND REUTILIZATION FOR A SINGLE-ROD ELECTRO-HYDROSTATIC ACTUATOR

(71) Applicant: University of Manitoba, Winnipeg (CA)

(72) Inventors: Badhushan Chithravelpillai, Winnipeg (CA); Gustavo Koury Costa, Jaboatao dos Guararapes (BR); Zeljko Tomas, Winnipeg (CA); Nariman Sepehri, Winnipeg (CA)

(73) Assignee: University of Manitoba, Winnipeg (CA)

( * ) Notice: Subject to any disclaimer, the term of this patent is extended or adjusted under 35 U.S.C. 154(b) by 183 days.

(21) Appl. No.: 18/412,851

(22) Filed: Jan. 15, 2024

(65) Prior Publication Data

US 2024/0309890 A1 Sep. 19, 2024

Related U.S. Application Data

(60) Provisional application No. 63/490,093, filed on Mar. 14, 2023.

(51) Int. Cl.
*F15B 21/14* (2006.01)
*F15B 1/02* (2006.01)
(Continued)

(52) U.S. Cl.
CPC .............. *F15B 21/14* (2013.01); *F15B 1/024* (2013.01); *F15B 1/033* (2013.01); *F15B 7/006* (2013.01);
(Continued)

(58) Field of Classification Search
CPC ...... F15B 21/14; F15B 21/082; F15B 21/087; F15B 1/024; F15B 1/033; F15B 2211/20515; F15B 2211/20569; F15B 2211/20576; F15B 2211/212; F15B 2211/27; F15B 2211/30525;
(Continued)

(56) References Cited

U.S. PATENT DOCUMENTS 7,234,298 B2 * 6/2007 Brinkman .............. F15B 7/006 60/475
8,997,476 B2 * 4/2015 Brinkman .............. F15B 21/14 60/456

(Continued)

*Primary Examiner* — Dustin T Nguyen
(74) *Attorney, Agent, or Firm* — Kyle R Satterthwaite; Ryan W Dupuis; Ade &Company Inc

(57) ABSTRACT

A method for storing and reutilizing energy during operation of a hydrostatic actuator (EHA) having a hydraulic cylinder, a first bidirectional pump-motor rotationally coupled to an electric motor, and EHA valving and connections between the first pump-motor and the hydraulic cylinder. During at least one of two motoring quadrants, a hydraulic accumulator is charged using a second pump-motor whose rotation is driven by load-driven motoring of the first bidirectional pump-motor. During at least one of the pumping quadrants, driven rotation is imparted to the second pump-motor using stored energy from the accumulator, and said driven rotation of the second pump-motor is used to augment powered rotation of the first bidirectional pump-motor by the electric motor.

15 Claims, 8 Drawing Sheets

(51) Int. Cl.

| | |
|---|---|
| ***F15B 1/033*** | (2006.01) |
| ***F15B 7/00*** | (2006.01) |
| ***F15B 21/08*** | (2006.01) |
| *E02F 9/20* | (2006.01) |
| *E02F 9/22* | (2006.01) |

(52) U.S. Cl.

CPC .......... *F15B 21/082* (2013.01); *F15B 21/087* (2013.01); *E02F 9/2075* (2013.01); *E02F 9/2217* (2013.01); *E02F 9/2235* (2013.01); *E02F 9/2289* (2013.01); *E02F 9/2296* (2013.01); *F15B 2211/20515* (2013.01); *F15B 2211/20561* (2013.01); *F15B 2211/20569* (2013.01); *F15B 2211/20576* (2013.01); *F15B 2211/20584* (2013.01); *F15B 2211/212* (2013.01); *F15B 2211/27* (2013.01); *F15B 2211/3051* (2013.01); *F15B 2211/3127* (2013.01); *F15B 2211/327* (2013.01); *F15B 2211/40515* (2013.01); *F15B 2211/40584* (2013.01); *F15B 2211/41581* (2013.01); *F15B 2211/4159* (2013.01); *F15B 2211/426* (2013.01); *F15B 2211/613* (2013.01); *F15B 2211/625* (2013.01); *F15B 2211/6313* (2013.01); *F15B 2211/6336* (2013.01); *F15B 2211/6346* (2013.01); *F15B 2211/6658* (2013.01); *F15B 2211/7053* (2013.01); *F15B 2211/7107* (2013.01); *F15B 2211/785* (2013.01); *F15B 2211/8609* (2013.01); *F15B 2211/88* (2013.01)

(58) Field of Classification Search

CPC ...... F15B 2211/50554; F15B 2211/625; F15B 2211/6309; F15B 2211/6313; F15B 2211/6658; F15B 2211/88; F15B 2211/3051; F15B 2211/3127; F15B 2211/327; F15B 2211/40515; F15B 2211/40584; F15B 2211/41581; F15B 2211/4159; F15B 2211/7107; F15B 2211/20584; F15B 2211/426; F15B 2211/613; F15B 2211/6336; F15B 2211/6346; F15B 2211/7053; F15B 2211/785; F15B 2211/8609; F15B 7/006

See application file for complete search history.

(56) References Cited

U.S. PATENT DOCUMENTS

| | | | | |
|---|---|---|---|---|
| 9,096,115 | B2 * | 8/2015 | Ho | E02F 9/2292 |
| 9,279,236 | B2 * | 3/2016 | Zhang | E02F 9/2292 |
| 9,382,927 | B2 * | 7/2016 | Ankargren | F15B 21/14 |
| 9,695,841 | B2 * | 7/2017 | Udagawa | E02F 9/2289 |
| 9,765,501 | B2 * | 9/2017 | Wang | F15B 21/14 |
| 10,138,915 | B2 * | 11/2018 | Bhaskar | E02F 9/2203 |
| 10,344,784 | B2 * | 7/2019 | Peterson | F15B 1/033 |
| 11,408,445 | B2 * | 8/2022 | Wang | F15B 11/17 |
| 2012/0233991 | A1 * | 9/2012 | Ivantysynova | F15B 11/17<br>60/413 |
| 2013/0098012 | A1 * | 4/2013 | Opdenbosch | E02F 9/2292<br>60/413 |

* cited by examiner p

ENERGY STORAGE AND REUTILIZATION FOR A SINGLE-ROD ELECTRO-HYDROSTATIC ACTUATOR

CROSS-REFERENCE TO RELATED APPLICATIONS

This application claims benefit under 35 U.S.C. 119(e) of U.S. Provisional Application No. 63/490,093, filed Mar. 14, 2023, the entirety of which is incorporated herein by reference.

FIELD OF THE INVENTION

The present invention relates generally to electro-hydrostatic actuators, and more specifically to solutions for capturing and reusing potentially wasted energy during the operation of such actuators.

BACKGROUND

Energetic efficiency is imperative as it directly impacts the fuel consumptions and the environment. One of the areas where efficiency should be considered is in mobile hydraulic machines. In excavators, for example, we usually find a number of single rod hydraulic cylinders and hydraulic motors. Hydraulic cylinders are known for providing high power density [1], high force-to-weight ratios, compactness, and quick responses [2], [3] which makes them desirable when compared to their electric actuator counterparts. In our current energy-demanding world, it is accounted that more than 50% of the energy resources come from the coal and oil products (fossil fuels). The resulting greenhouse gas (CO2) emissions have increased by 1.5 times in 2020 when compared to 1990 and has been increasing till now [4]. Due to the associated greenhouse effect, reduction of fossil fuel consumption has been a major concern for manufacturers. For instance, in a typical excavator valve-controlled actuator require about 23% of the engine output to perform work such as digging and lifting while the remaining energy is dissipated within mechanical and hydraulic components [5]. Most of the energy dissipation occurs due to throttling loses at the control valves. Therefore, improving the energetic efficiency of hydraulic systems will, eventually, decrease emission rates and fuel demands in the long run.

A proven solution that increases efficiency by eliminating throttling loses, is the use of pump-controlled actuator systems where pumps are used to control cylinders instead of valves [6]. In these systems, flow can be controlled by either changing the pump displacement or the prime-mover rotational speed. In this latter case, it is the prime mover that ultimately controls the velocity of the hydraulic cylinder, and the resulting system is termed—"Electro-Hydrostatic Actuator" (EHA). EHAs, therefore, require a prime mover connected to a fixed-displacement, bidirectional pump-motor, whose ports are then connected to a hydraulic cylinder [7]. EHAs have many advantages when compared to valve-controlled actuators, such as easy maintainability, light weight and simple structure, high reliability and little heat loss [8]. However, due to the asymmetric nature of the single-rod cylinder, a challenge is posed when dealing with the uneven flows into and out of the pump. One solution, designed by Costa and Sepehri [9], is characterized by a particular four-quadrant division of the circuit operation, where pumping and motoring quadrants are precisely defined. It is thus understood that during motoring quadrants, the circuit receives mechanical power from the load. However, the pump-motor remains connected to the prime mover (AC servomotor) at motoring quadrants, so that power is still added to the system to control the cylinder speed, by providing a resistive torque at the pump-motor shaft that acts against the hydraulically-generated torque [9]. Therefore, the received mechanical power is simply wasted in the form of heat during motoring quadrants. To improve the EHA efficiency, it is necessary to minimize the potentially wasted energy at motoring quadrants. It is therefore desirable to develop techniques that can capture the otherwise wasted energy during motoring operations.

Several research studies have been conducted to capture and reuse the potentially wasted energy in excavators by employing energy storage components such as hydraulic accumulators, batteries, and supercapacitors. Combining one or more of these components with the actuator systems results in electric hybrids, hydraulic hybrids, or combined electric-hydraulic hybrids. Lin et al. developed a supercapacitor-based electric hybrid system for an excavator to store and reuse boom potential energy. The developed system consisted of an engine, an electric motor, a hydraulic pump, a directional valve, a proportional throttle valve, a controllable electric generator, and a hydraulic motor. During the energy storage process (boom lowering), the hydraulic motor runs the generator, which converts the potential energy into electrical energy, storing it in the supercapacitor. The stored energy can then be reused at the electric motor, adding to the engine power required by the system. Consequently, the power supplied by the engine can be lowered, improving system efficiency by 39%. The low energy density of supercapacitors, large sizes of generators and electric motors, and the presence of the directional valve, place some restrictions on this design. In another design, a battery-based electric hybrid that could increase efficiency up to 54% was proposed by Yoon et al. [11]. The system was actuated by a bidirectional fixed displacement pump-motor driven by an electric motor and a generator. A three-way/three-position directional valve was used along with a proportional pressure relief valve to distribute the uneven flow. During the energy storage process (boom lowering), the bidirectional pump-motor acts as a motor which drives the generator. The potential energy is thus converted into electric energy and is stored in a battery. The stored energy is employed, along with the main power, to lift the boom when necessary. Energy losses during the energy conversion process, low power density of the battery and the large generator and motor sizes limit this design.

A hydraulic hybrid system developed by Hu et al for an excavator arm, consisted of a displacement pump driven by an engine, a four-way directional control valve, a two-position/three-way valve and a two-position/two-way valve. During the energy storage process, the flow returning from the cylinder is directed into the accumulator, storing the gravitational potential energy in the form of hydraulic energy. The stored energy is then used to assist the hydraulic pump during actuation. This system is capable of increasing efficiency by 25.9%. However, the presence of the four-way directional control valve leads to undesirable energy dissipation. Ivantysynova et al. developed a hydraulic hybrid system for an excavator, operating with a 50% downsized engine. The design consists of two accumulators: a low-pressure accumulator and a high-pressure accumulator. The low-pressure accumulator is used for flow-compensation in the circuit. On the other hand, the high-pressure accumulator stores the braking energy of the swing motor, the unused energy from the engine and the potential energy entered through the cylinders. When the engine requires additional power, the high-pressure accumulator drives the variable displacement pump-motor. Energy is also reused by supplying power to the swing motor when necessary. The downside of this design is the high cost.

Hydraulic accumulators can only store a limited amount of energy besides occupying a considerable space in the hydraulic circuit. Based on this fact, studies have been conducted to combine electric and hydraulic hybrids. A combined electric-hydraulic hybrid system proposed by Chen and Zhao is capable of increasing the efficiency from 41.9% to 64.5%. This system uses two fixed displacement pump-motors, a DC motor and two on-off valves. During the energy storage process, valves are activated to direct part of the pressurized flow (potential energy) to the hydraulic accumulator via one of the two pump-motors. If the potential energy of the boom is higher than the storage capacity of the accumulator, the energy excess is branched off through the shafts of the pump-motors, to be stored in a supercapacitor. During the energy reutilization process (boom lifting), part of the cap-side flow is supplemented via the hydraulic accumulator through the second pump-motor. The stored energy in the supercapacitor is also used to drive the pumps. Ge et al. proposed a combined electric-hydraulic system using a novel asymmetric pump with three ports, driven by a servomotor. It has been reported that this design could recover about 82.7% of the total potential energy. Two of the asymmetric pump ports are connected to the cap-side and rod-side of the cylinder, respectively, while the third port is connected to an accumulator. During the energy storage process (boom lowering), the gravitational potential energy is stored as hydraulic energy and electric energy in the accumulator and the supercapacitor, respectively. In the energy recovery process (boom lifting), the stored energy drives the asymmetric pump.

Most of the research so far has focused on hydraulic actuators moving the excavator boom (down/up), and very little has been dedicated to hydraulic actuators working under more involved recoverable time periods. Accordingly, there remains a need for a more optimal solution, preferably one that is cost-effective, simple, easy to implement and maintain, and connectable to existing EHAs in a simple and safe manner. The proposed invention fulfills the aforementioned requirements.

SUMMARY OF THE INVENTION

According to a first aspect of the invention, there is provided an electro-hydrostatic actuator system comprising:

- an electro-hydrostatic actuator (EHA) comprising:
  - a first bidirectional pump-motor rotationally coupled to an electric motor that is operable to drive a pumping operation of said first bidirectional pump-motor;
  - a hydraulic cylinder; and
  - EHA valving and connections between the first bidirectional pump-motor and the hydraulic cylinder by which the EHA is operable in four distinct operating quadrants, including a first actuator-extending pumping quadrant, a second actuator-extending motoring quadrant, a third actuator-retracting pumping quadrant and a fourth actuator-retraction motoring quadrant; and
- an energy storing and reutilizing (ESR) system comprising:
  - a second pump-motor rotationally linked to the first bidirectional pump-motor via a rotational interconnection;
  - a hydraulic accumulator; and
  - ESR valving and connections between said second pump-motor and said hydraulic accumulator that, collectively, are configured to (a) during at least one of the motoring quadrants, operate the ESR system in an energy storage mode charging the hydraulic accumulator using driven rotation of the second pump-motor, via the rotational interconnection, from load-driven motoring of the first bidirectional pump-motor; and (b) during at least one of the pumping quadrants, operate the ESR system in an energy reutilizing mode driving the second pump-motor from stored energy in the accumulator, and thereby, via said rotational interconnection, supplementing driven rotation of the first bidirectional pump-motor in assistive relation to the electric motor.

According to a second aspect of the invention, there is provided an energy storage and reutilization (ESR) system for cooperative use with an electro-hydrostatic actuator (EHA) having a hydraulic cylinder, a first bidirectional pump-motor rotationally coupled to an electric motor, and EHA valving and connections between the first bidirectional pump-motor and the hydraulic cylinder by which the EHA is operable in four distinct operating quadrants, including a first actuator-extending pumping quadrant, a second actuator-extending motoring quadrant, a third actuator-retracting pumping quadrant and a fourth actuator-retraction motoring quadrant, said system comprising:

- a second pump-motor arranged to be rotationally linked to the first pump-motor via a rotational interconnection;
- a hydraulic accumulator; and
- ESR valving and connections between said second pump-motor and said hydraulic accumulator that, collectively, are configured to (a) during at least one of the motoring quadrants, operate the ESR system in an energy storage mode charging the hydraulic accumulator using driven rotation of the second pump-motor, via the rotational interconnection, from load-driven motoring of the first bidirectional pump-motor; and (b) during at least one of the pumping quadrants, operate the ESR system in an energy reutilizing mode driving the second pump-motor from stored energy in the accumulator, and thereby, via said rotational interconnection, supplementing driven rotation of the first bidirectional pump-motor in assistive relation to the electric motor.

According to a third aspect of the invention, there is provided a method for storing and reutilizing energy during operation of a hydrostatic actuator (EHA) having a hydraulic cylinder, a first bidirectional pump-motor rotationally coupled to an electric motor, and EHA valving and connections between the first pump-motor and the hydraulic cylinder by which the EHA is operable in four distinct operating quadrants, including a first actuator-extending pumping quadrant, a second actuator-extending motoring quadrant, a third actuator-retracting pumping quadrant and a fourth actuator-retraction motoring quadrant, said method comprising:

- during at least one of the motoring quadrants, charging a hydraulic accumulator using a second pump-motor whose rotation is driven by load-driven motoring of the first bidirectional pump-motor; and
- during at least one of the pumping quadrants, imparting driven rotation to the second pump-motor using stored energy from the accumulator, and using said driven rotation of the second pump-motor to augment powered rotation of the first bidirectional pump-motor by the electric motor.

BRIEF DESCRIPTION OF THE DRAWINGS

Preferred embodiments of the invention will now be described in conjunction with the accompanying drawings in which.

DETAILED DESCRIPTION

Figure 1:
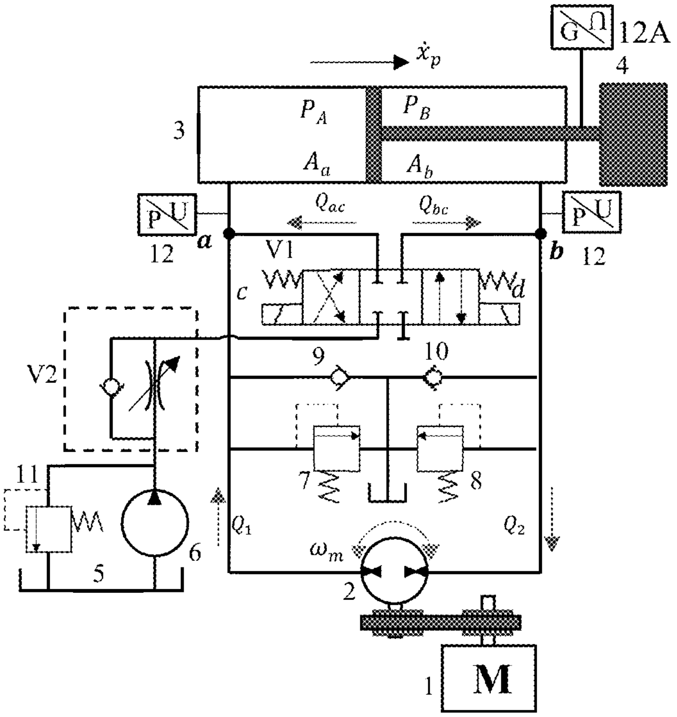
FIG. 1 is a schematic illustration of an electro-hydrostatic actuator (EHA) of the aforementioned type designed by Costa and Sepehri [9], for the purpose of setting an operational context for an energy storage and reutilization (ESR) system of the present invention.
Figure 2A:
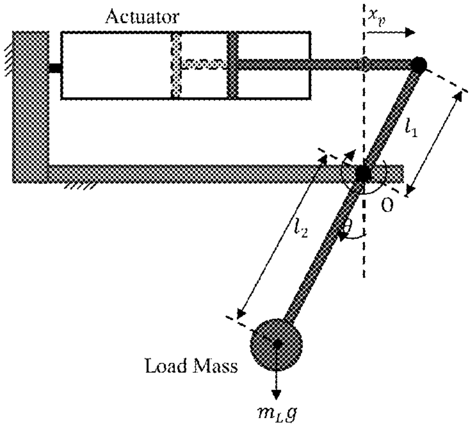
FIG. 2A is a schematic illustration of a backhoe arm that embodies the hydraulic cylinder from the EHA of FIG. 1 for the purpose of driving a connected linkage carrying a load mass, thereby demonstrating one possible operating environment in which the ESR of the present invention may be implemented to beneficial effect.
Figure 2B:
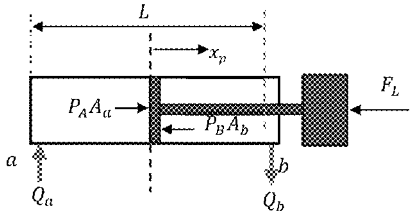
FIG. 2B is a force balance diagram of the hydraulic cylinder from FIG. 1.
Figure 3:
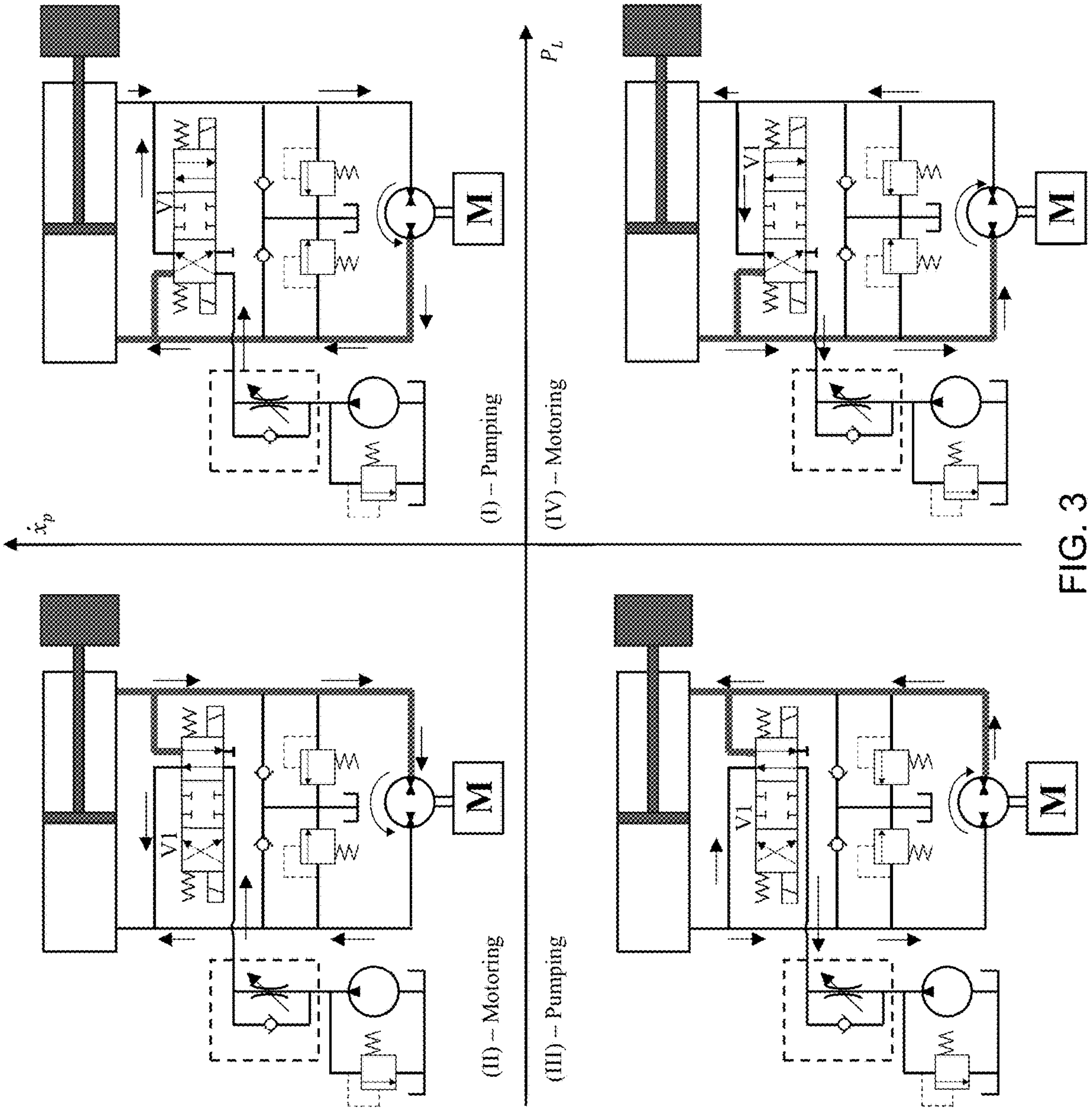
FIG. 3 schematically illustrates four distinct operational quadrants of the EHA of FIG. 1.

Reference is made initially to illustration of relevant prior art in FIGS. 1-3 in order to establish the operating context of the present invention. The schematic of the aforementioned EHA designed by Costa and Sepehri [9] is shown in FIG. 1. The circuit is composed of an AC servomotor 1, that drives a fixed displacement bidirectional pump-motor 2, through a belt transmission. The pump-motor drives a single-rod hydraulic cylinder 3 to effect displacement of a rod 4 thereof for the purpose of physically manipulating a load mass. A compensation circuit of the EHA features a tank 5, from which the charge pump 6 supplies flow to compensate for the differential cylinder effect through valves V2 and V1. Of those valves, V1 is a three-position four-way directional valve, and V2 is a unidirectional flow control valve. A set of relief valves 7, 8 and check valves 9, 10 limit the pressure level within a main circuit of the EHA and prevent cavitation. Another relief valve 11 is also provided in the compensation circuit. Two pressure transducers, 12, are mounted on the hydraulic lines of the main circuit of the EHA, close to the cylinder ports, to measure the cap- and rod-side pressures $P_A$, $P_B$, and a displacement sensor 12A (e.g. incremental encoder), for example mounted on the hinge of a backhoe arm in which the cylinder 3 is embodied in FIG. 2A, is used to measure the displacement of the cylinder rod 4. The cylinder rod velocity, $$\dot{x}_p$$

is calculated, for example using a 100-point regression algorithm, from the encoder readings. The outlet pressure of the charge pump 6, is set to an appropriate pressure, for example 80 psi, through the relief valve 11 of the compensation circuit. As used herein, load pressure, $P_L$, is calculated as $$P_L = P_A - \frac{A_b}{A_a} P_B$$

where $A_a$ is the piston face area of the hydraulic cylinder on the cap side thereof, and $A_b$ is the piston face area on the rod side.

To define the operation quadrants, a sign convention for the load pressure, $$P_L\left(P_L = P_A - \frac{A_b}{A_a} P_B\right),$$

and cylinder rod velocity, $$\dot{x}_p,$$

is established. The cylinder rod velocity, $$\dot{x}_p$$

is termed positive during cylinder extension and negative during retraction. Based on the signs of the cylinder rod velocity and load pressure, four quadrants of operation, I, II, III and IV are defined. Quadrant I is defined for $P_L>0$ and $$\dot{x}_p > 0$$

Quadrant III is defined for $P_L<0$ and $$\dot{x}_p < 0$$

These are pumping quadrants, where the energy flows from the circuit to the load. On the other hand, motoring quadrants (II and IV) are those where energy flows from the load to the circuit. Quadrant II is defined for $P_L<0$ and $$\dot{x}_p > 0$$

while quadrant IV is defined for $P_L>0$ and $$\dot{x}_p < 0$$

During quadrants I and III, the pump consumes energy from the prime mover to extend and retract the cylinder. In quadrants II and IV, the load assists the cylinder motion. As a result, energy coming from the load drives the pump, now operating as a motor.

The schematic of the arm linkage of the backhoe arm and the force balance on the actuator are shown in FIG. 2. FIG. 3 displays the four-quadrant operation of the EHA. In the various hydraulic circuit diagrams included among the figures, the thicker lines represent the pressurized sides. Note that additional flow is supplied to the cylinder during quadrants I and II while the excess flow is sent back to the tank at quadrants III and IV. The connection between the compensation (charge) pump 6, and the main circuit is carried out by activating the solenoids of the directional valve V1.

Figure 4:
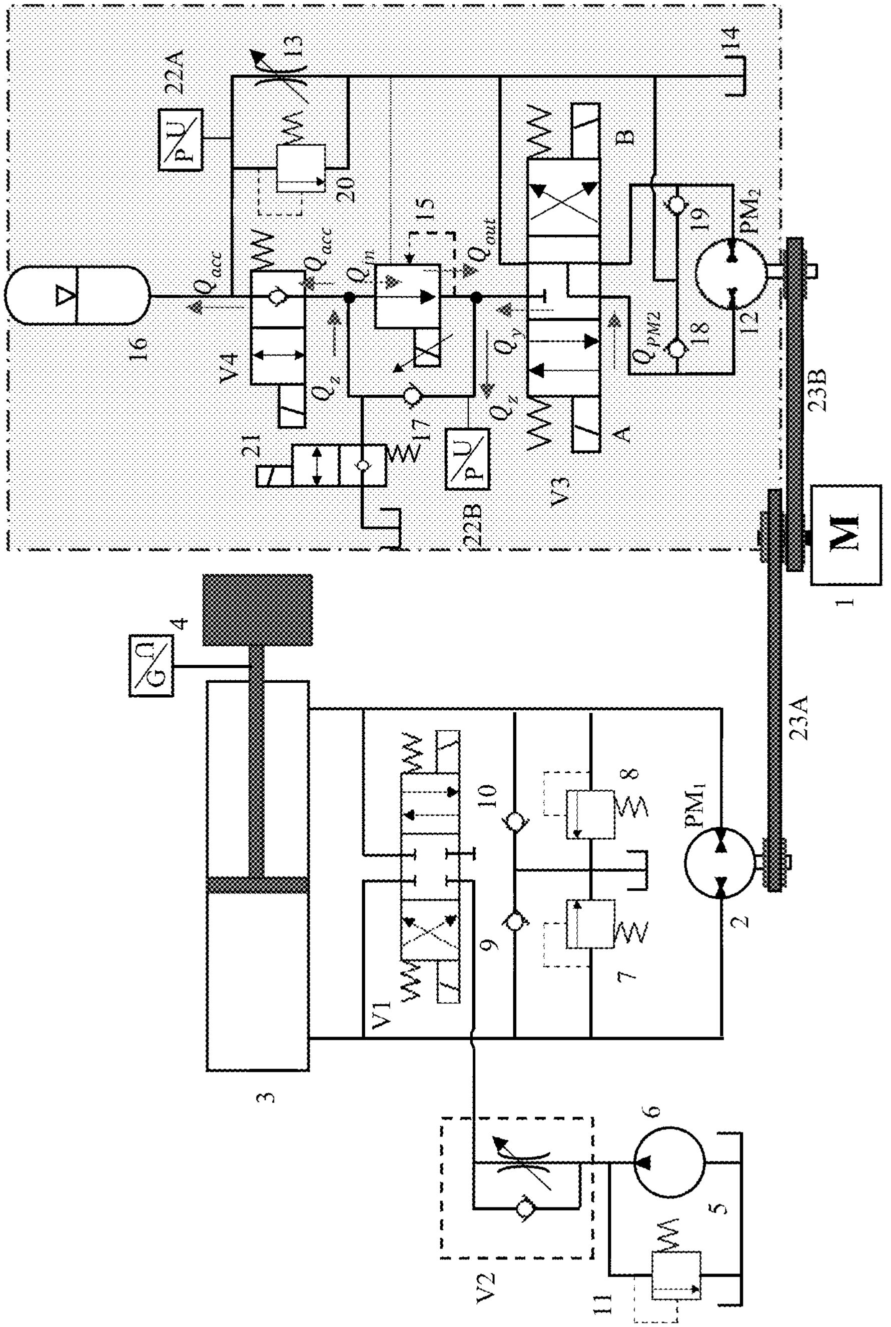
FIG. 4 is a detailed schematic illustration of the inventive ESR system of the present invention installed in operative connection to the EHA of FIG. 1.

Turning now to a preferred embodiment of the present invention, the inventive ESR system is shown in FIG. 4 in mechanically connected, but hydraulically isolated, operating relationship to the EHA from preceding FIGS. 1-3. The ESR system comprises the following hydraulic components: a fixed-displacement bidirectional pump-motor ($PM_2$) 12, a flow discharge valve 13, a tank 14, an electro-proportional pressure-reducing valve (EPPRV) 15, a hydraulic accumulator 16, one storage check valve 17, a float-centre type three-position four-way directional valves V3, a reutilization valve V4, two check valves 18 and 19, a relief valve 20, a bleed-off valve 21 and two pressure transducers 22A, 22B. The two pressure transducers 22A, 22B are mounted on the ESR circuit, one 22A next to the hydraulic accumulator 16 and one 22B between the float-centre directional valve V3 and the EPPRV 15 to measure the pressure stored in the hydraulic accumulator 16 and the reduced pressure coming from the EPPRV 15, during energy reutilization.

Pump-motor $PM_1$ of the EHA and pump-motor $PM_2$ of the ESR are rotationally interconnected to one another, in the illustrated example, by a pair of respective belt transmissions 23A, 23B each coupled to the driveshaft of the AC servomotor 1. Other than electronic connection of sensors, solenoids and other electronic control componentry for controlled operation of the ESA and ESR system as a functional combination, this mechanical interconnection between the two pump-motors to enable rotation of either one thereof by the other is the sole physical connection between the ESA and the ESR system, the respective hydraulic circuits of which are fluidically isolated from one another. All energy transfer from the hydraulic circuit of one to the other occurs via intermediate conversion and transmission of mechanical energy via the belt transmissions, or other substitutable mechanical means of rotational energy transfer from one pump-motor to the other.

The ESR system has four operation modes: storage, reutilization, discharge and idle flow circulation. The shaft of the pump-motor $PM_2$ can be rotated in two directions during storage and reutilization. Therefore, this design has two storage modes and two reutilization modes. Both storage and reutilization modes are operated using the float-centre directional valve V3, and the reutilization valve V4. The reutilization valve acts as an on-off valve for the hydraulic accumulator discharge. A built-in check valve guarantees that oil can only flow in one direction when storing energy in the hydraulic accumulator. When V4 is activated, oil flows in both directions and the accumulator can discharge into the pump-motor $PM_2$, by activating either side of valve V3. The central position of V3, is used for flow recirculation.

Figure 5A:
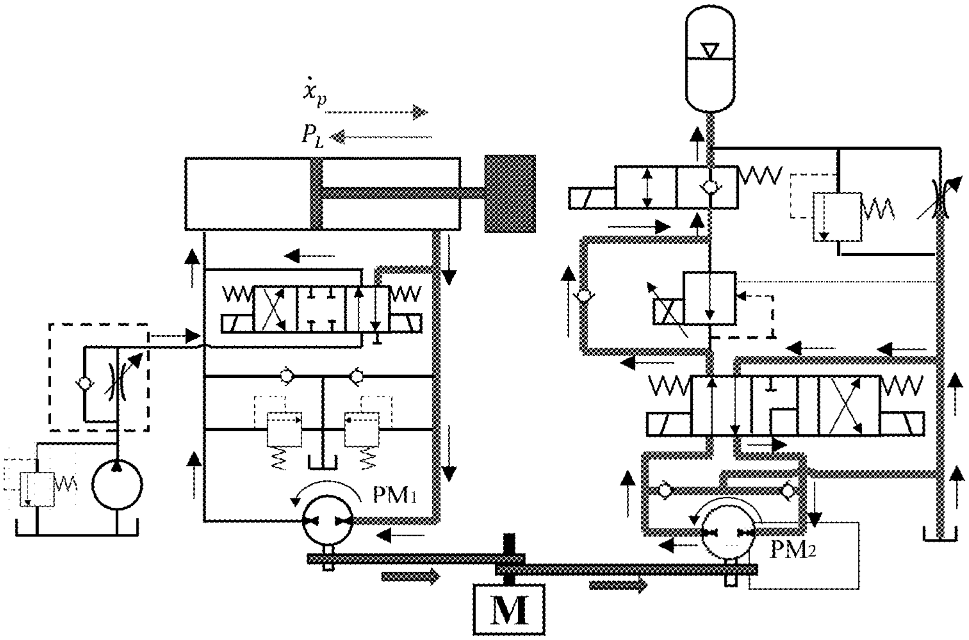
FIG. 5A schematically illustrates cooperative operation of the EHA and ESR system of FIG. 4 in an energy storage mode during the second operating quadrant of the ESA.
Figure 5B:
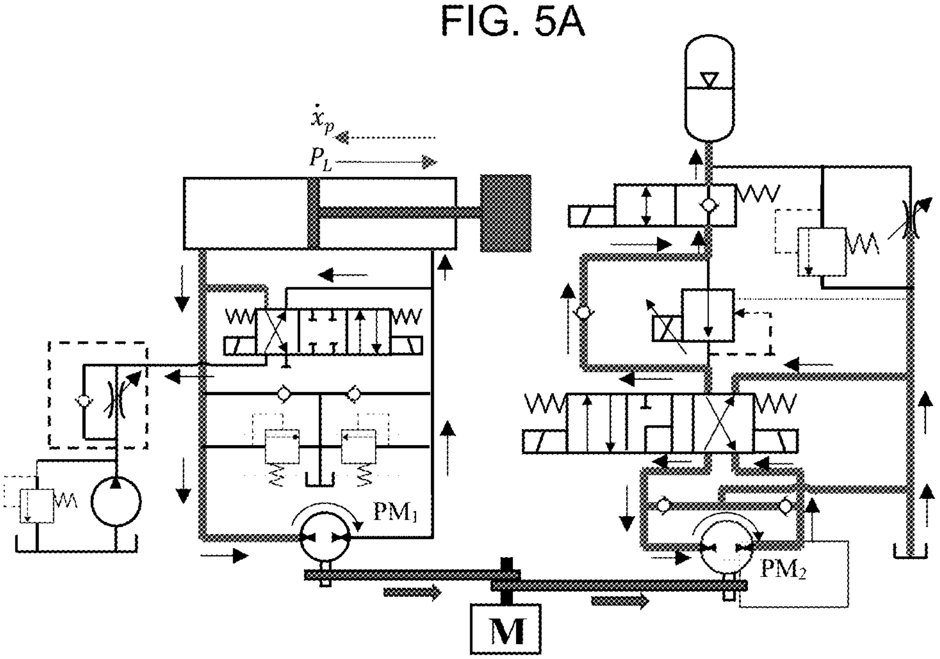
FIG. 5B schematically illustrates cooperative operation of the EHA and ESR system of FIG. 4 in the energy storage mode during the fourth operating quadrant of the ESA.

Storage operation modes of the ESR are carried out during the motoring operations of the pump-motor $PM_1$ of the EHA. As such, the gravitational potential energy of the load is stored in the hydraulic accumulator 16 of the ESR. When the assistive force rotates $PM_1$ in counter-clockwise direction (quadrant II), $PM_2$ is likewise rotated in this same counter-clockwise direction via belt transmission 23B, and the ESR circuit is operated to charge the hydraulic accumulator 16 through the pump $PM_2$. To do this, valve V3 of the ESR circuit is shifted to the left (via activation of solenoid A) and while valve V4 is maintained at its rest position, which connects $PM_2$ to the hydraulic accumulator 16. The flow pumped by $PM_2$ passes through valve V3, reaching valve V4 through check valve 17, and continues onward from valve V4 to the hydraulic accumulator, where energy is stored, as shown in FIG. 5A). During quadrant IV, the assistive force instead drives $PM_1$ and $PM_2$ in a clockwise direction. To once again use this assisted rotation of $PM_2$ to charge the accumulator 16, solenoid B of valve V3 is activated to shift valve V3 to the right position, while leaving valve V4 at rest, thus charging the accumulator 16 in the manner shown in FIG. 5B. The amount of stored energy depends on the pressure setting of the relief valve 20.

Reutilization modes are initiated when the hydraulic accumulator 16 is fully loaded, and the main pump $PM_1$ requires auxiliary power. It is known that the discharging pressure of hydraulic accumulator 16 is not constant, since the pressure depends on the pressurized gas volume. In order to have a constant-pressure discharge, the EPPRV 15 is used. The EPPRV 15 is, therefore, controlled by the pressures read at transducers 22A, 22B.

Figure 6A:
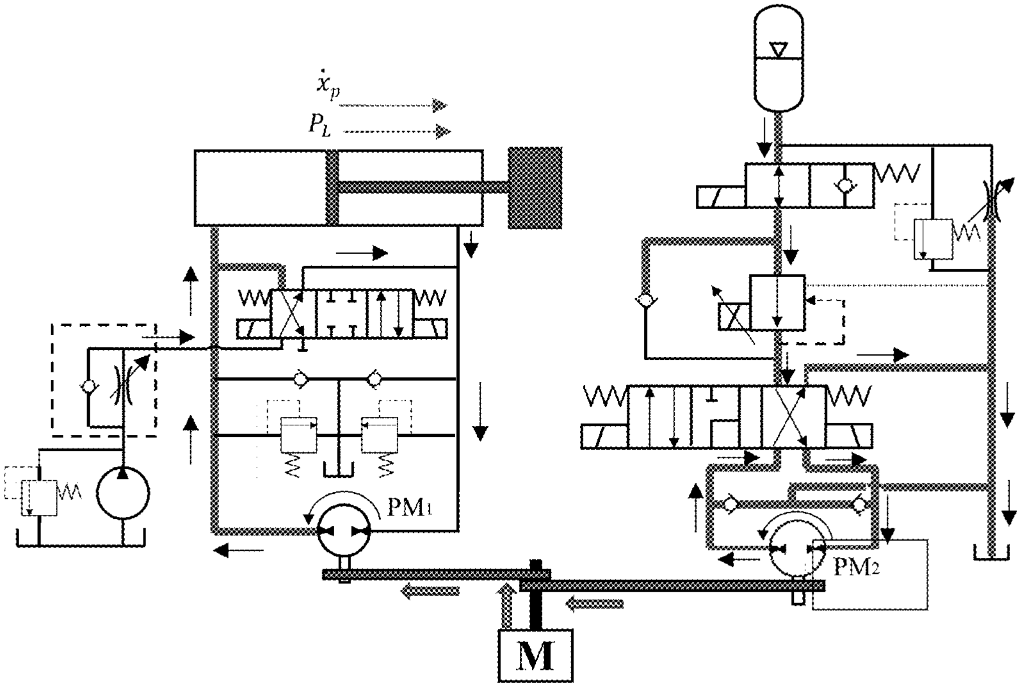
FIG. 6A schematically illustrates cooperative operation of the EHA and ESR system of FIG. 4 in an energy reutilization mode during the first operating quadrant of the ESA.
Figure 6B:
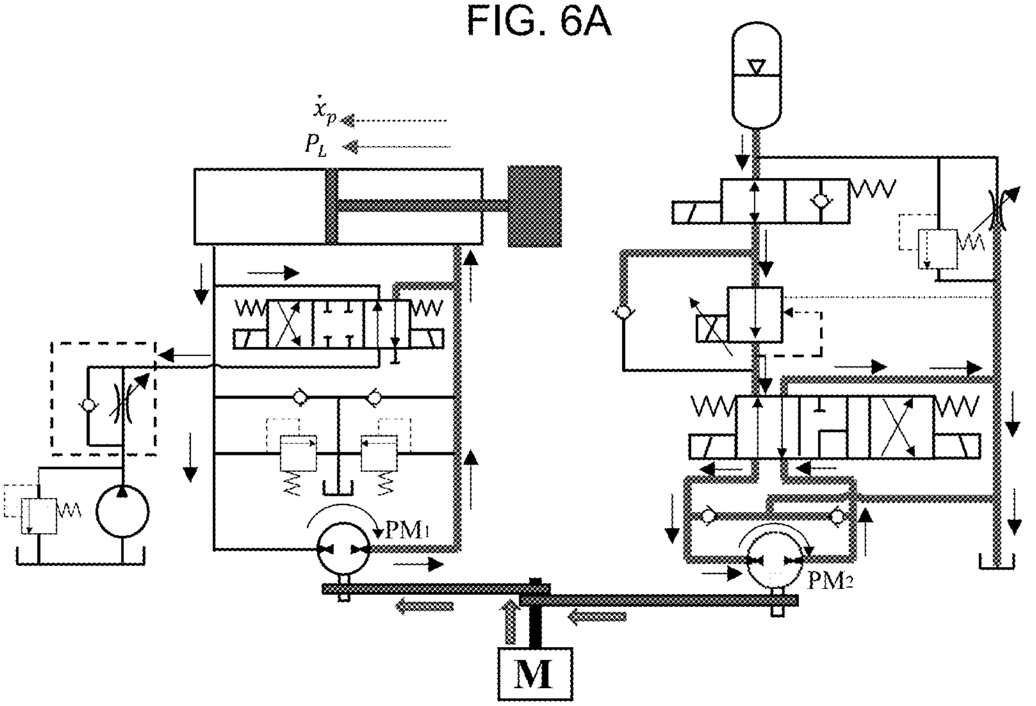
FIG. 6B schematically illustrates cooperative operation of the EHA and ESR system of FIG. 4 in the energy reutilization mode during the third operating quadrant of the ESA.

The auxiliary power stored in the hydraulic accumulator 16 is used to assist the servomotor 1 in operating the ESA during the energy reutilization process. This is shown in FIGS. 6A and 6B. During quadrant I (FIG. 6A), the valves in the ESR circuit are adjusted to provide a constant torque at $PM_2$. Before initiating this process, the flow discharge valve 13, remains closed and valve V4 is activated. As a result, the accumulator 16 discharges through valve 15 at a constant-pressure flow, $Q_{out}$ (see FIG. 4). With solenoid B of valve V3 activated, flow coming from the EPPRV 15 drives rotation of $PM_2$ in a counter-clockwise direction. As a result, this accumulator driven rotation of $PM_2$ helps the servomotor 1 drive $PM_1$. FIG. 6B shows the circuit operating at quadrant III, where solenoid A of valve V3 is instead activated. In this case, $PM_2$ is again driven by the stored energy from the accumulator 16, but this time in a clockwise direction, and once again thereby augments the rotational drive power imparted to $PM_1$ by the servomotor 1.

Figure 7A:
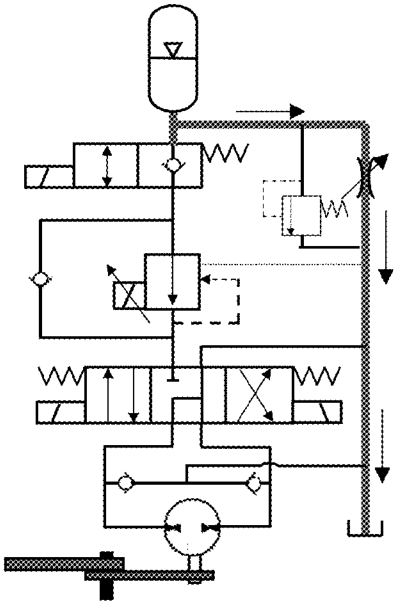
FIG. 7A schematically illustrates operation of the ESR system of FIG. 4 in a discharge mode to relieve system pressure therefrom.
Figure 7B:
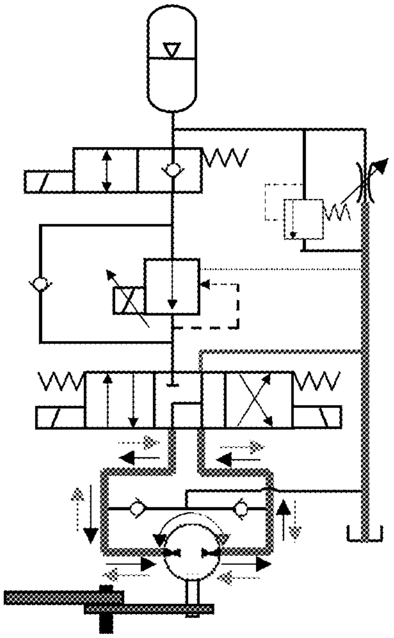
FIG. 7B schematically illustrates operation of the ESR system of FIG. 4 in an idle flow circulation mode thereof.

The discharge and idle flow circulation operation modes are shown in FIGS. 7A and 7B. During discharge mode (FIG. 7A), the main valves V3 and V4 in the ESR circuit are set to their original (rest) positions. The flow-discharge valve 13, is then opened to connect the accumulator 16 to the tank and 14 and thereby relieve the pressure within the ESR circuit. In idle flow circulation mode (FIG. 7B), the flow discharge valve 13 remains closed while main valves V3 and V4 are again kept at rest position. With regards to these two modes of operation, discharge mode is used when de-energization of the ESR system is required, while idle mode simply decouples the EHA from the ESR circuit, from a purposive perspective, by recirculating the ESR'S fluid around a closed-loop path, thereby temporarily disabling the ESR's ability to discharge the accumulator and impart assistive drive energy to the EHA, but while retaining any accumulated charge already possessed by the accumulator 16 at the time of idle mode switchover.

Figure 8:
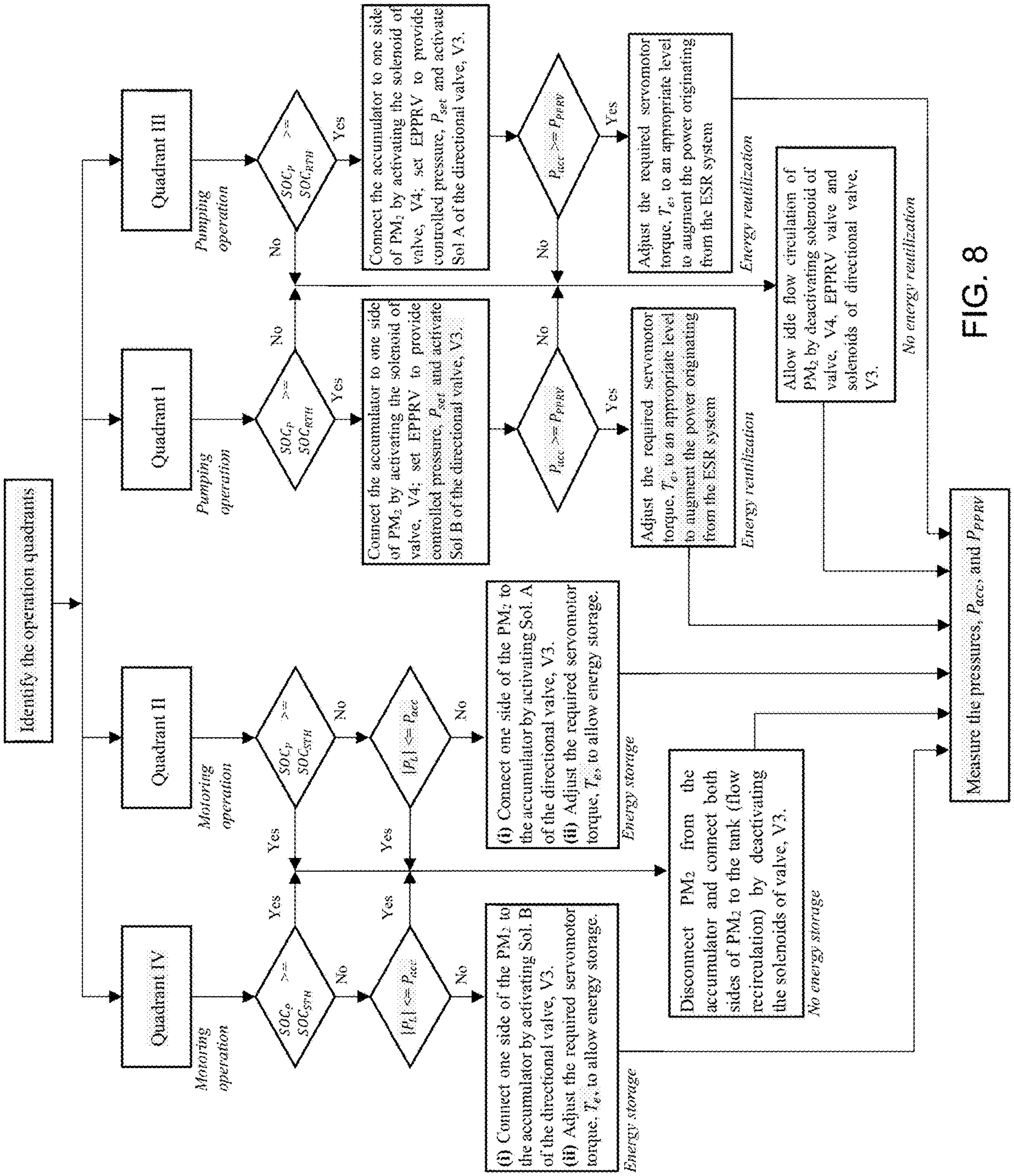
FIG. 8 is an operational flowchart illustrating a control logic algorithm for controlling valving of the ESR system to switch between the energy storage, energy reutilization and idle flow circulation modes thereof.

In order to combine the ESR system with the EHA and activate the ESR system during certain operation quadrants, a control algorithm is implemented. One exemplary embodiment of such control algorithm is shown in FIG. 8. The algorithm begins with the determination of the current operating quadrant, based on the load pressure, $P_L$, and the cylinder rod velocity, $\dot{x}_p$. In the event that either motoring quadrant is identified as the current operating quadrant, the energy stored in the accumulator is analyzed by comparing the state of charge, $$SOC_P(SOC_P = \frac{P_{acc} - P_{min}}{P_{max} - P_{min}},$$

where $P_{max}$ and $P_{min}$ are the maximum pressure of the accumulator and the pre charged gas pressure, and $P_{acc}$ is the accumulator pressure) with the predefined storage limit, $SOC_{STH}$ which limits the amount of energy stored in the accumulator. If $SOC_P < SOC_{STH}$, then the load pressure $P_L$ and the accumulator pressure $P_{acc}$ are compared. Energy can only be stored in the accumulator when the load pressure is greater than the accumulator pressure, given that, it is only during this period that the pump-motor $PM_1$ is capable of driving the pump-motor $PM_2$. So, the control algorithm checks if $SOC_P < SOC_{STH}$, and $P_L > P_{acc}$, and if so, then the control algorithm initiates the energy storage mode by activating the appropriate quadrant-dependent solenoid of valve V3. In addition, the servomotor torque, $T_e$, can be automatically adjusted by the algorithm to an optimal value (by adjusting the servomotor input, U), in order to speed up the system when the load pressure reaches the accumulator pressure. If the load pressure $P_L$ is lower than the accumulator pressure $P_{acc}$, the motoring energy of $PM_1$ is insufficient to drive $PM_2$. In other words, if the gravitational potential energy of the load is lower than the energy stored in the accumulator 16, this would cause $PM_1$ to stall at motoring quadrants. To overcome this, the servomotor torque, $T_e$, is adjusted back to its original value by the control algorithm, which also switches the ESR system over to idle mode by deactivating the solenoids of valve V3.

If either pumping quadrant is identified as the current operating quadrant, this signals an opportunity for potential reutilization of stored energy from the accumulator. After such identification of either pumping quadrant as the current operating quadrant, the algorithm compares the state of charge $SOC_P$, with the predefined reutilization limit, $SOC_{RTH}$ which determines the activation state of the energy reutilization process. If $SOC_P > SOC_{RTH}$, the solenoid of the reutilization valve V4, is activated by the algorithm to allow the accumulator 16 to discharge energy. Simultaneously, a proportional input is applied to the EPPRV 15 to provide for a predetermined output pressure, $P_{set}$. Next, the appropriate quadrant-dependent solenoid of valve V3 is activated to connect the accumulator 16 to $PM_2$. The accumulator pressure $P_{acc}$ is also compared with the EPPRV output pressure $P_{PPRV}$ to ensure that the accumulator pressure remains at least as high as the output pressure $P_{PPRV}$ of the EPPRV, in which case reutilization can continue, and the servomotor torque, $T_e$, can be adjusted to an appropriate level to complement the power generated by the ESR system. On the other hand, if the accumulator pressure falls below the EPPRV output pressure $P_{PPRV}$, the reutilization process is terminated by deactivating the solenoids of valve V3, valve V4 and the EPPRV 15, thereby switching the ESR system into idle mode.

The utility of the above described ESR system was experimentally confirmed with test rig employing a John Deere JD-48 backhoe arm, composed of a single rod cylinder that drives an attached inertial load. The load mass of the test rig is composed of a set of iron disks and can be adjusted by adding or removing disks. The cylinder is operated by the above cited and described EHA where the ports of the bidirectional pump-motor are directly connected to the cylinder ports. Flow compensation is, thus, necessary because of the differential cylinder areas and is carried out through a directional valve, controlled by a logic algorithm executed by a general-purpose computer connected to a data acquisition device, which thereby collectively embody an electronic controller. The selected data acquisition device (DAQ) of the test rig is a Quanser Q8, which receives input signals from the cap- and rod-side pressure transducers 12 at the cylinder 3, from a joystick controller and from the rod displacement sensor also provided at the cylinder 3. Based on the pressure and displacement readings, and evaluation thereof by the algorithm, the controller provides control signals to the solenoids of the EHA's directional valve V1. On the other hand, the joystick provides an external input for driving the prime mover (servomotor 1), which can also be commanded through a computer-generated signal, such as a step function.

ESR capability was added to the test rig by incorporating a hydraulic accumulator to store hydraulic energy, which was connected to the EHA using the inventive ESR circuit described above and schematically illustrated in FIGS. 4-7. As explained above, the ESR circuit is responsible for energy storage and its subsequent reutilization. The controller communicates with the EHA based on the pressure and rod displacement readings (from the latter of which the cylinder rod velocity is derived by the controller) to decide how and when to activate the ESR circuit, the pressure transducers and valve solenoids of which are also connected to the controller's inputs and outputs. Depending on the operational quadrant and the measured signals from the ESR system, the controller sends control signals to the valve solenoids of ESR valves 15, V3 and V4, and to servomotor 1, to activate and control energy storage and reutilization. When energy storage is activated, the servomotor power/torque is decreased and $PM_1$ operates as a motor, driving $PM_2$. As a result, the accumulator 16 is charged, and energy is stored. When energy reutilization is activated, the accumulator 16 acts as an auxiliary power source to drive motor $PM_2$ which, then, supplies extra power to the servomotor 1, which in turn is connected to $PM_1$ to drive rotation thereof with the combined power output of the ESR system and servomotor 1.

To validate the proposed design, a prototype of the ESR circuit was built. Before manufacturing the components, the minimum assistive torque that can be generated by the ESR system to the servomotor was determined. The servomotor in the prototyped example produces a maximum torque of 6 Nm to run the EHA, and based on this value, a 2 Nm assistive torque was chosen for the experimental model. Note this value was chosen based on the desired charging time and precharge pressure of the hydraulic accumulator. Next, the hydraulic accumulator was sized and selected. In the prototyped example, an existing gas loaded, piston-type accumulator, with an inner volume of 9.64 L was used. The commercial reference for the chosen accumulator is Parker-A4N0578D1K. The minimum and the maximum working pressures of the ESR system were determined using the maximum energy storage limit and the pre-charge pressure of the accumulator. Once determined, the remaining ESR components were selected.

Simulations and experiments were conducted to verify the efficacy and the applicability of the ESR system. The experimental evaluations suggest that the designed ESR system can decrease the input power of the main source by at least 44.2% in minimum and 70.2% in maximum. Thereby, enhancing the energetic efficiency. This proves the proposed ESR system is highly viable especially for heavy-duty hydraulic arms during load handling. Moreover, due to its easy implementation and simple configuration, it can even be used in any EHA applications for both energy storage and energy reutilization.

Since various modifications can be made in our invention as herein above described, and many apparently widely different embodiments of same made, it is intended that all matter contained in the accompanying specification shall be interpreted as illustrative only and not in a limiting sense.

REFERENCES

[1] L. Wang and W. J. Book, "Using Leakage to Stabilize a Hydraulic Circuit for Pump Controlled Actuators," *Journal of Dynamic Systems, Measurement, and Control*, vol. 135, pp. 061007-1 December 2013.

[2] G. Ren, G. K. Costa and N. Sepheri, "Position control of an electro-hydrostatic asymmetric actuator operating in all quadrants," *Mechatronics*, vol. 67, p. 102344, 2020.

[3] N. Niksefat, N. Sepheri and Q. Wu, "Design and experimental evaluation of a QFT contact taskcontroller for electro-hydraulic actuators," *International Journal of Robust and Nonlinear Control*, vol. 17, pp. 225-250, 2007.

[4] IEA, "CO2 emissions by energy source," IEA, 2020. [Online]. Available: https://www.iea.org/articles/global-energy-review-co2-emissions-in-2020. [Accessed 9 Oct. 2021].

[5] L. Ge, L. Quan, X. Zhang, Z. Dong and J. Yang, "Power Matching and Energy Efficiency Improvement of Hydraulic Excavator Driven with Speed and Displacement Variable Power Source," *Chinese Journal of Mechanical Engineering*, vol. 32, no. 100, pp. 1-12, 2019.

[6] G. K. Costa and N. Sepehri, Hydrostatic Transmissions and Actuators Operation, Modelling and Applications, Hoboken, NJ, USA: Wiley, 2015.

[7] M. Pachter, C. H. Houpis and K. Kang, "Modelling and Control of an Electro-hydrostatic Actuator," *International Journal of Robust and Non-Linear Control*, vol. 7, p. 591-608, 1997.

[8] J. Choi, "Robust position control of electro-hydrostatic actuator systems with radial basis function neural networks," *Journal of Advanced Mechanical Design, Systems, and Manufacturing*, vol. 7, no. 2, pp. 257-267, 2013.

[9] G. K. Costa and N. Sepehri, "Four-Quadrant Analysis and Four-Quadrant Analysis and Hydrostatic Actuators," *Journal of Dynamic Systems, Measurement, and Control*, vol. 141, pp. 021011-(1-15), 2019.

[10] T. Lin, W. Huang, H. Ren, S. Fu and Q. Liu, "New compound energy regeneration system and control strategy for hybrid hydraulic excavators," *Automation in Construction*, vol. 68, pp. 11-20, 2016.

[11] J. I. Yoon, D. Q. Truong and K. K. Ahn, "A Generation Step for An Electric Excavator with a Control Strategy and Verifications of Energy Consumption," *International Journal of Precision Engineering and Manufacturing*, vol. 14, no. 5, pp. 755-766, 2013.

[12] B. Hu, X. He, G. Xiao, L. Tan and Y. Jiang, "Research on the efficiency of Arm's potential energy regeneration system for a hydraulic mini excavator," in *International Conference on Advances in Construction Machinery and Vehicle Engineering* (*ICACMVE*), Changsha, 2019.

[13] R. Hippalgaonkar and M. Ivantysynova, "Optimal Power Management of Hydraulic Hybrid Mobile Machines-Part I: Theoretical Studies, Modeling and Simulation," *Journal of Dynamic Systems, Measurement, and Control,* 2016.

[14] M. Chen and D. Zhao, "The gravitational potential energy regeneration system with closed-circuit of boom of hydraulic excavator," *Mechanical Systems and Signal Processing*, vol. 82, pp. 178-192, 2016.

[15] L. Ge, L. Quan, Y. Li, X. Zhang and J. Yang, "A novel hydraulic excavator boom driving system with high efficiency and potential energy regeneration capability," *Energy Conversion and Management*, vol. 165, pp. 308-217, 2018.

The invention claimed is:

1. An electro-hydrostatic actuator system comprising:

an electro-hydrostatic actuator (EHA) comprising:

a first bidirectional fixed displacement pump-motor rotationally coupled to an electric motor that is operable to drive a pumping operation of said first bidirectional pump-motor;

a hydraulic cylinder; and in an EHA circuit in which the first bidirectional pump-motor and the hydraulic cylinder are both installed, EHA valving and connections between the first bidirectional pump-motor and the hydraulic cylinder by which the EHA is operable in four distinct operating quadrants, including a first actuator-extending pumping quadrant, a second actuator-extending motoring quadrant, a third actuator-retracting pumping quadrant and a fourth actuator-retraction motoring quadrant; and an energy storing and reutilizing (ESR) system comprising:

a second fixed displacement pump-motor rotationally linked to the first bidirectional pump-motor via a rotational interconnection that is continuously maintained therebetween throughout all operational modes of the ESR system;

a hydraulic accumulator; and in a fluidically separate ESR circuit of fluidically isolated relationship to the EHA circuit, and in which the second pump-motor and the hydraulic accumulator are installed, ESR valving and connections between said second pump-motor and said hydraulic accumulator that, collectively, are configured to (a) during at least one of the motoring quadrants, operate the ESR system in an energy storage mode charging the hydraulic accumulator using driven rotation of the second pump-motor, via the rotational interconnection, from load-driven motoring of the first bidirectional pump-motor; (b) during at least one of the pumping quadrants, operate the ESR system in an energy reutilizing mode driving the second pump-motor from stored energy in the accumulator, and thereby, via said rotational interconnection, supplementing driven rotation of the first bidirectional pump-motor in assistive relation to the electric motor, and (c) switch the ESR system into an idle flow-circulation mode, in which the accumulator is hydraulically decoupled from the second bidirectional fixed displacement pump-motor, based on sensor-detection of accumulator pressure conditions denoting an unsustainability of the energy reutilizing mode.

2. An energy storage and reutilization (ESR) system for cooperative use with an electro-hydrostatic actuator (EHA) having a hydraulic cylinder, a first bidirectional fixed displacement pump-motor rotationally coupled to an electric motor, and EHA valving and connections between the first bidirectional pump-motor and the hydraulic cylinder by which the EHA is operable in four distinct operating quadrants, including a first actuator-extending pumping quadrant, a second actuator-extending motoring quadrant, a third actuator-retracting pumping quadrant and a fourth actuator-retraction motoring quadrant, said system comprising:

a second bidirectional fixed displacement pump-motor arranged to be rotationally linked to the first pump-motor via a rotational interconnection continuously maintained therebetween throughout all operational modes of the ESR system;

a hydraulic accumulator; and in an ESR circuit configured to operate in fluidic isolation from a separate hydraulic circuit of the ESR system, ESR valving and connections between said second pump-motor and said hydraulic accumulator that, collectively, are configured to (a) during at least one of the motoring quadrants, operate the ESR system in an energy storage mode charging the hydraulic accumulator using driven rotation of the second pump-motor, via the rotational interconnection, from load-driven motoring of the first bidirectional pump-motor; (b) during at least one of the pumping quadrants, operate the ESR system in an energy reutilizing mode driving the second pump-motor from stored energy in the accumulator, and thereby, via said rotational interconnection, supplementing driven rotation of the first bidirectional pump-motor in assistive relation to the electric motor, and (c) switch the ESR system into an idle flow-circulation mode, in which the accumulator is hydraulically decoupled from the second bidirectional fixed displacement pump-motor, based on sensor-detection of accumulator pressure conditions denoting an unsustainability of the energy reutilizing mode.

3. The system claim 2 wherein the ESR valving and connections are further configured to switch the ESR system into a discharge mode in which the accumulator is hydraulically communicated with a tank to relieve pressure from the ESR system.

4. The system of claim 2 wherein the ESR valving includes a directional valve having a default position closing a hydraulic pathway between the second bidirectional fixed displacement pump-motor and the accumulator, and two actuated positions each connecting a different respective side of the second bidirectional fixed displacement pump-motor to the accumulator via said pathway to achieve the energy storage mode in a respective one of the motoring quadrants.

5. The system of claim 2 wherein the ESR valving includes a reutilization valve having a one-way check position allowing flow into the accumulator, but blocking outward flow therefrom, and a two-way open position allowing flow in both into and from the accumulator.

6. The system of claim 2 wherein the ESR valving includes an electro-proportional pressure-reducing (EPPR) valve operated in responsive relation to sensor-monitored accumulator pressure and sensor-monitored EPPR-reduced pressure to maintain constant pressure output from the accumulator in the energy reutilizing mode.

7. The system of claim 2 further comprising an electronic controller operably coupled to the ESR valving, and to one or more sensors installed among at least one of the EHA and the ESR system, and configured to execute one or more control algorithms that are operable to:

identify which of the four distinct operating quadrants the EHA is currently operating in;

after identification that the EHA is operating in one of the motoring quadrants, identify whether operating conditions are conducive to driving of the second bidirectional fixed displacement pump-motor by the first bidirectional fixed displacement pump motor; and after identification that said operating conditions are conducive to driving of the second bidirectional fixed displacement pump-motor by the first bidirectional fixed displacement pump motor, signal the ESR valving to initiate the energy storage mode of the ESA.

8. The system of claim 7 wherein the electronic controller is further configured such that said one or more control algorithms are also operable to:

after identification that said operating conditions are not conducive to driving of the second bidirectional fixed displacement pump-motor by the first bidirectional fixed displacement pump-motor, signal the ESR valving to hydraulically decouple the accumulator from the second bidirectional fixed displacement pump motor and initiate recirculating flow within the ESR system.

9. The system of claim 7 wherein the electronic controller is further configured such that the identification of whether operating conditions are conducive to driving of the second bidirectional fixed displacement pump-motor by the first bidirectional fixed displacement pump-motor is based on controller-executed comparison of a sensor-read accumulator pressure against a sensor-read load pressure.

10. The system of claim 7 wherein the electronic controller is further configured such that the identification of which quadrant the ESA is currently operating in is based on controller-executed comparison of a sensor-read load pressure against a sensor-read rod velocity of the hydraulic cylinder.

11. The system of claim 7 wherein the electronic controller is further configured such that the one or more control routines also include, after identification that said operating conditions are conducive to driving of the second bidirectional fixed displacement pump-motor by the first bidirectional fixed displacement pump-motor, and in at least some instances, performing controller-executed adjustment of a torque of the electric motor.

12. The system of claim 7 wherein the electronic controller is further configured such that said one or more control algorithms also include:

after identification that the EHA is operating in one of the pumping quadrants, identify whether a current state of charge exceeds a reutilization limit; and after identification that said current state of charge exceeds a reutilization limit, signal the ESR valving to initiate the energy reutilization mode of the ESA.

13. The system of claim 12 wherein the electronic controller is further configured such that said one or more control algorithms also include:

in at least some instances during the energy reutilization mode, controller-executed adjustment of a torque of the electric motor to augment power derived from the ESR system for the first bidirectional fixed displacement pump-motor.

14. The system of claim 2 wherein the rotational interconnection between the first and second pump-motors occurs via the electric motor.

15. The system of claim 2 wherein the rotational interconnection between the first and second bidirectional fixed displacement pump-motors comprises at least one belt transmission.

* * * * *